United States Patent
Ortega

(10) Patent No.: US 6,728,676 B1
(45) Date of Patent: Apr. 27, 2004

(54) USING SPEECH RECOGNITION TO IMPROVE EFFICIENCY OF AN INVENTORY TASK

(75) Inventor: Kerry A. Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 09/691,976

(22) Filed: Oct. 19, 2000

(51) Int. Cl.$^7$ .............................................. G10L 21/00
(52) U.S. Cl. ....................... 704/270; 704/231; 704/275; 704/235; 705/22; 705/27
(58) Field of Search ................................ 704/231, 275, 704/270, 235; 705/22, 27, 28

(56) References Cited

U.S. PATENT DOCUMENTS

| | | | | |
|---|---|---|---|---|
| 5,799,276 A | * | 8/1998 | Komissarchik et al. ...... | 704/251 |
| 5,884,258 A | * | 3/1999 | Rozak et al. ................ | 704/251 |
| 5,909,667 A | * | 6/1999 | Leontiades et al. .......... | 704/275 |
| 6,134,548 A | * | 10/2000 | Gottsman et al. .............. | 707/5 |
| 6,144,848 A | * | 11/2000 | Walsh et al. ................. | 455/419 |
| 6,185,527 B1 | * | 2/2001 | Petkovic et al. ............. | 704/231 |
| 6,195,635 B1 | * | 2/2001 | Wright ........................ | 704/231 |
| 6,233,559 B1 | * | 5/2001 | Balakrishnan ............... | 704/275 |
| 6,289,312 B1 | * | 9/2001 | Raman ........................ | 704/270 |
| 6,308,893 B1 | * | 10/2001 | Waxelbaum et al. ... | 235/472.01 |
| 6,446,076 B1 | * | 9/2002 | Burkey et al. ............... | 707/102 |
| 6,463,413 B1 | * | 10/2002 | Applebaum et al. ......... | 704/256 |
| 6,553,345 B1 | * | 4/2003 | Kuhn et al. .................. | 704/275 |
| 6,577,861 B2 | * | 6/2003 | Ogasawara ................... | 455/419 |
| 2002/0016739 A1 | * | 2/2002 | Ogasawara ................... | 705/22 |
| 2002/0055844 A1 | * | 5/2002 | L'Esperance et al. ........ | 704/260 |
| 2002/0072918 A1 | * | 6/2002 | White et al. .............. | 704/270.1 |
| 2002/0099542 A1 | * | 7/2002 | Mitchell et al. ............. | 704/231 |
| 2002/0143529 A1 | * | 10/2002 | Schmid et al. ............... | 704/231 |

* cited by examiner

*Primary Examiner*—Richemond Dorvil
*Assistant Examiner*—Qi Han
(74) *Attorney, Agent, or Firm*—Akerman Senterfitt

(57) ABSTRACT

An inventory method can include assigning a tracking number to each movable item in a set of movable items and speaking the tracking number and a corresponding item description and condition to a speech enabled inventory application in a computing device. The speech enabled inventory application can speech-to-text convert the spoken tracking number and corresponding item description and condition. Moreover, the speech enabled inventory application can provide at least one statistically alternate recognized word for each of the spoken tracking number and corresponding item description and condition. One tracking number, one item description and one item condition can be selected from among the spoken and alternate tracking numbers, the spoken and alternate item descriptions, and the spoken and alternative item conditions. Finally, the speech enabled inventory application can store the selected tracking number, item description and condition in an inventory database.

24 Claims, 6 Drawing Sheets

USING SPEECH RECOGNITION TO IMPROVE EFFICIENCY OF AN INVENTORY TASK

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to speech recognition, and more particularly to a method and apparatus of using speech recognition to improve the efficiency of an inventory task.

2. Description of Related Art

Inventory tasks are prevalent in numerous applications, and many inventory systems involve the arduous task of filling out paper forms in duplicate. For example, when a homeowner's household goods are moved, one of the tasks that is commonly performed is to inventory the homeowner's personal effects. Typically, hired movers inventory the homeowner's personal effects by affixing an identifier or tracking number thereto. These tracking numbers are then recorded on an inventory sheet that serves as a detailed record of the items to be moved. Associated with each tracking number, the movers also commonly hand-write the name of the item and record a brief description of the condition of the item prior to loading the item onto a moving truck. The description of an item's condition often comprises a series of codes that are designed to improve the speed at which the movers can prepare their forms. As a result, the completed inventory sheet can be unintelligible to the homeowner, especially when a legend or key to the mover's codes is inconvenient or unavailable. Notably, the task of inventorying all of the homeowner's goods can consume several hours. Additionally, the resulting forms can be lengthy, difficult to read and comprehend, and confusing to the homeowner.

BRIEF SUMMARY OF THE INVENTION

A method and apparatus for using speech recognition to improve the efficiency of a basic inventory task is provided. More specifically, the method is preferably implemented by a machine readable storage mechanism having stored thereon a computer program having a plurality of code sections for performing an inventory task in a speech recognition application. A preferred implementation of the method comprises first receiving in a speech enabled inventory application a specified tracking number and storing the specified tracking number in an inventory database.

Second, a spoken item description can be received in the speech enabled inventory application. The spoken item description can be speech-to-text converted into a speech recognized item description. The speech recognized item description can be displayed in the video display unit. Additionally, at least one alternative item a description can be generated based on the speech recognized item description. The at least one alternative item description also can be displayed in the video display unit. An item description can be selected from among the speech recognized and at least one alternative item descriptions in the inventory database and the selected item can be stored in the inventory database.

Third, a spoken item condition can be received in the speech enabled inventory application. The spoken item condition can be speech-to-text converted into a speech recognized item condition. The speech recognized item condition can be displayed in the video display unit. Additionally, at least one alternative item condition can be generated based on the speech recognized item condition. The at least one alternative item condition also can be displayed in the video display unit. Subsequently, an item description can be selected from among the speech recognized and the at least one item conditions in the inventory database and the selected item description can be stored in the inventory database. Notably, each of the first three steps can be repeated until all items have been inventoried. Moreover, the third step can be repeated until all item conditions have been recorded.

In one aspect of the invention, the step of receiving a tracking number can include receiving in the speech enabled inventory application a spoken tracking number; speech-to-text converting the spoken tracking number into a speech recognized tracking number; displaying the speech recognized tracking number in a video display unit; generating at least one alternative tracking number based on the speech recognized tracking number; and, displaying the at least one alternative tracking number in the video display unit; storing a selected tracking number selected from among the speech recognized and at least one alternative tracking numbers in the inventory database. In another aspect of the invention, the step of receiving a tracking number can include scanning a tracking number encoded in a bar code label; and, storing the scanned tracking number in the inventory database.

Notably, the at least one alternative tracking number can be a statistically alternative recognized text to the first audio speech signal. Likewise, the at least one alternative item description can be a statistically alternative recognized text to the spoken item description. Finally, the at least one alternative condition can be a statistically alternative recognized text to the spoken item condition.

An inventory method also can include assigning a tracking number to each movable item in a set of movable items and speaking the tracking number and a corresponding item description and condition to a speech enabled inventory application in a computing device. The speech enabled inventory application can speech-to-text convert the spoken tracking number and corresponding item description and condition. Moreover, the speech enabled inventory application can provide at least one statistically alternate recognized word for each of the spoken tracking number and corresponding item description and condition.

One tracking number, one item description and one item condition can be selected from among the spoken and alternate tracking numbers, the spoken and alternate item descriptions, and the spoken and alternative item conditions. Finally, the speech enabled inventory application can store the selected tracking number, item description and condition in an inventory database. Notably, the assigning step can include automatically generating a next tracking number in a sequence of tracking numbers; and, assigning the automatically generated next tracking number to the movable item.

The method also can include generating a report listing stored tracking numbers and corresponding item descriptions and conditions. Alternatively, the method can include establishing a communications link between the computing device and at least one other computing device; and, electronically transmitting the stored inventory database over the communications link to selected ones of the at least one other computing device. In one aspect of the invention, the computing device can be a handheld computing device. Moreover, where communicatively linked to other computing devices, the computing devices can be handheld computing devices which can communicate across a wireless communications link.

BRIEF DESCRIPTION OF THE SEVERAL VIEWS OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

In accordance with the inventive arrangements, speech recognition technology can be used to improve the efficiency of performing an inventory task.

Figure 1:
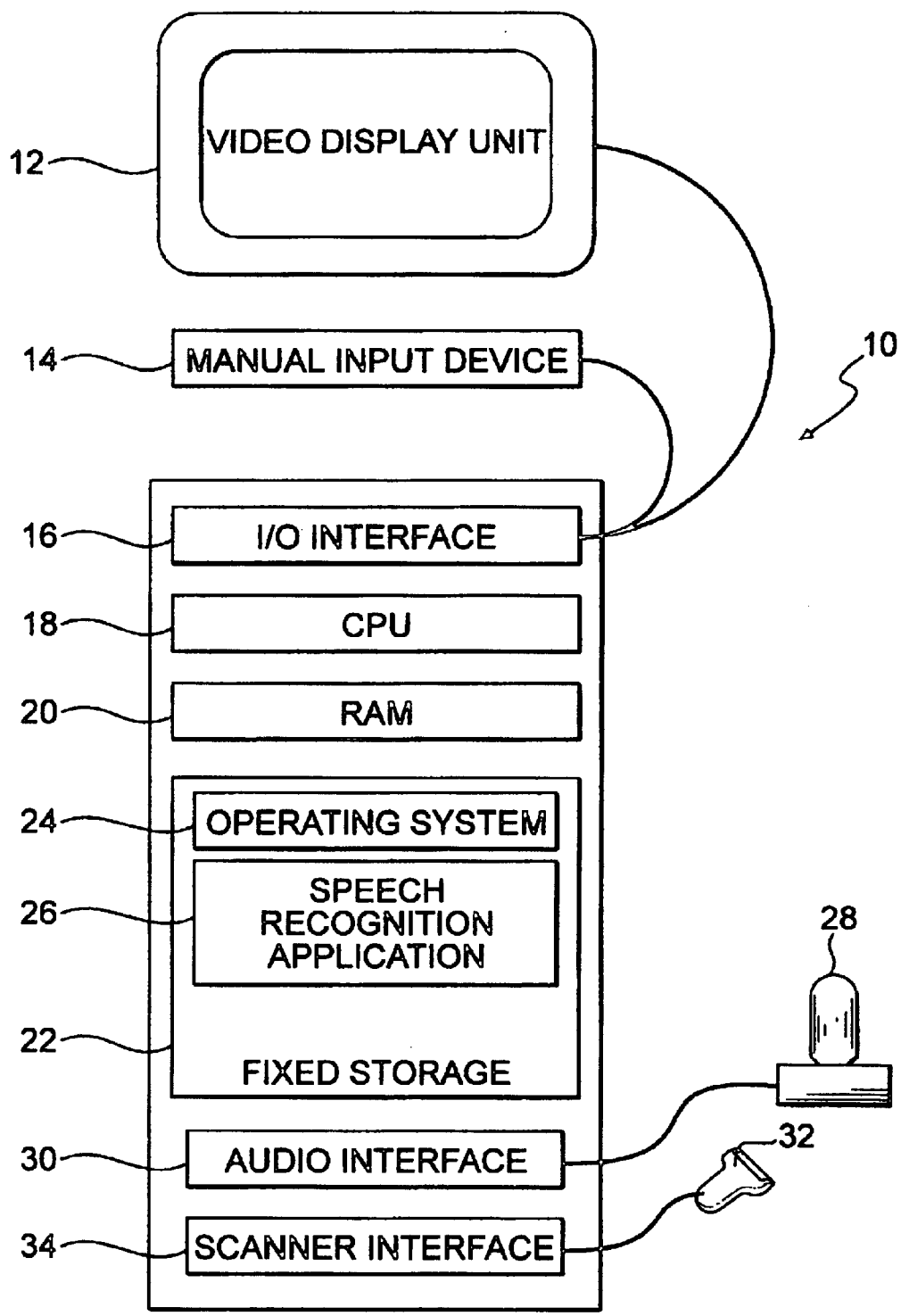
FIG. 1 is a block diagram of an embedded computer device by which the method of the present invention may be practiced.

Referring now to FIG. 1, the present invention can be implemented in a handheld embedded computing device 10. The computing device 10 can have a video display unit 12 and a manual input device 14 such as a QWERTY keyboard, soft keyboard, touch screen overlay on the video display unit 12, or any other type of manual input device. The manual input device 14 can used to input information related to a particular person being moved, such as their old and new addresses, phone numbers, and other related information. It may also be used to input unrecognized audio speech signals, as will be elaborated upon. Both the video display unit 12 and manual input device 14 are preferably attached to and in communication with the computing device 10 through an input/output (I/O) interface 16 comprising I/O circuitry. In addition, both are preferably integrated parts of the handheld computing device 10.

Internally, the computing device 10 can include a central processing unit (CPU) 18, an internal memory device 20 such as random access memory (RAM), and a fixed storage media 22 such as flash memory or a hard disk drive. The CPU 18 can be any suitable microprocessor or other electronic processing unit known to those skilled in the art. For example, the CPU 18 could include a Pentium III microprocessor from Intel Corporation of Santa Clara, Calif., the PowerPC microprocessor from International Business Machines Corporation of Armonk, N.Y., the Athlon microprocessor from AMD Corporation of Sunnyvale, Calif., or the StrongARM processor available from ARM Ltd. of Cambridge, England.

A microphone 28 also can be attached to and in communication with the computing device 10 through an audio interface 30 comprising audio circuitry. The audio interface 30 provides the computing device 10 with audio processing capabilities. For example, the microphone 28, which is preferably an integrated part of the computing device 10, can receive audio speech signals for subsequent processing by the audio circuitry of the audio interface 30. In addition, a bar scanner 32 and scanner interface 34 can also be included as components of the computing device 10 in order to allow an alternate method of receiving a Tracking Number, as will be elaborated upon below. As known, the audio interface 30 and scanner interface 34 can also be included as parts of the more generalized I/O interface 16 of the computing device 10.

Figure 2:
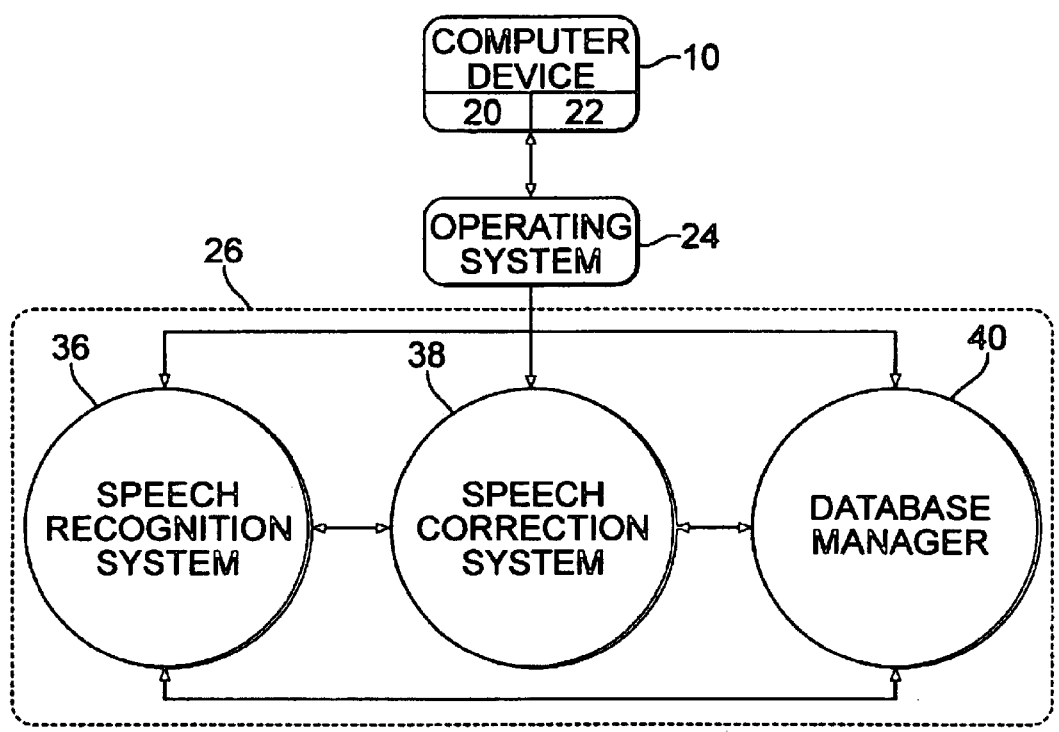
FIG. 2 is a block diagram showing a typical high-level computer architecture for use with the computer device of FIG. 1.

FIG. 2 illustrates a preferred architecture for the computing device 10 of FIG. 1, wherein the fixed storage media 22 of the computing device 10 can store therein an Operating System 24 and a Speech Recognition Application 26 by which the present method can be practiced. The Operating System 24 is preferably one of the Windows family of operating systems from Microsoft Corporation of Redmond, Wash. However, the invention is not limited in this regard, as the invention can be implemented with any suitable operating system such as the widely available Linux Operating System, an embedded operating system such as the QNX Neutrino® and VxWorks® from Wind River Systems, Inc. of Alameda, Calif., or the PalmOS from Palm, Inc. of Santa Clara, Calif.

The Speech Recognition Application 26 can include a Speech Recognition System 36, a Speech Correction System 38, and a Database Manager 40. Moreover, the Speech Recognition System 36 can include a Speech Recognition Engine for speech-to-text converting audio speech signals into computer-recognizable text. In addition, the Speech Correction System 38 allows for the correction of any mis-recognitions occurring in the speech-to-text conversion process. Finally, the Database Manager 40 can be used to store therein data, for example data from speech-to-text conversions. Notably, while FIG. 2 shows separate application programs for the Speech Recognition Application 26, the invention is not limited in this regard as the individual application programs can be implemented as a single, complex computer application program as well.

The Speech Recognition System 36 can be programmed to detect four types of speech signals received in the Speech Recognition Application 26 through the microphone 28. Specifically, the Speech Recognition System 36 can detect a Tracking Number to be associated with an item to be inventoried (N), the Item Name (I), a brief description of the condition of the item (C), and command-and-control operations that command the computing device 10 to execute indicated tasks. More particularly, in operation, after a speech signal has been received, the speech signal can be communicated through the audio interface 30 to the Operating System 24. Subsequently, the speech signal can be made available to the Speech Recognition Application 26 for having performed thereon the various speech recognition functions. For example, the Speech Recognition Engine of the Speech Recognition System 36 can perform speech-to-text conversion of the four types of speech signals.

Figure 3:
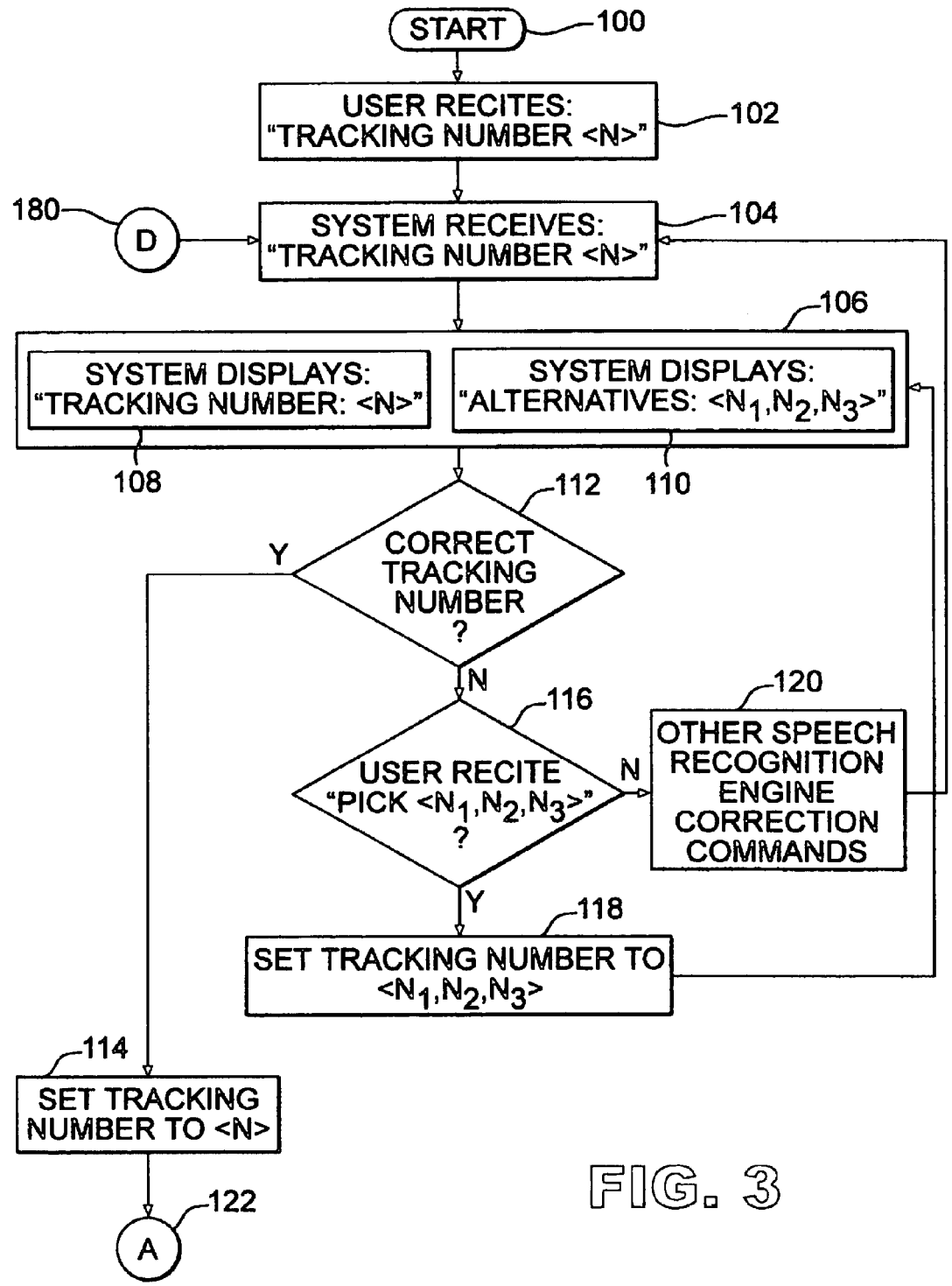
FIGS. 3–6 are flowcharts illustrating a method for using speech recognition to improve the efficiency of an inventory task.

Referring now particularly to FIG. 3, the inventive method can begin at step 100 with the activation of the computing device. Notably, upon activation, it will be appreciated by one skilled in the art that information relating to a particular inventory task may already exist in the computing device 10 at the time of activation of the computing device in accordance with step 100. Notwithstanding, the invention is not limited in this regard and in other aspects of the invention, no information relating to the particular inventory task may exist in the computing device 10.

Subsequent to activation, the method then operates over a single or plurality of auditory speech events, with the user intermittently checking the video display unit 12 to confirm what the Speech Recognition System 36 received and what portions, if any, of the Speech Correction System 38 need to be employed. In step 102, the user speaks an analog audio speech signal that is speech-to-text converted into a speech recognized text comprising a Tracking Number N, for example "55085."

An attention phrase or command word such as "Tracking Number" or "Computer" may preface the recitation of the actual Tracking Number N. Alternatively, the tracking number N may be input from the optical scanner 32 or keyed in from the manual input device 14 or other if it is not otherwise recognized, whereupon it is received by the Speech Recognition System 36 in step 104. In practice, the recited Tracking Number N corresponds to a physical sticker or other identifier that is placed on the homeowner's item to be moved. If the Speech Recognition System 36 recognizes that a particular Tracking Number N has previously been used in the context of the present move, an error message can be generated and displayed to the user on the video display unit 12.

After the Speech Recognition System 36 successfully receives a valid Tracking Number N in step 104, it is displayed on the video display unit 12 at step 106. In one aspect of the present invention, the video display unit 12 can display a split screen whereby two or more views can be simultaneously displayed to the user. When so embodied, the left view of the video display unit 12 may display the Tracking Number N prefaced by a label identifier such as "Tracking Number," as indicated at step 108.

Based upon the Tracking Number N received by the Speech Recognition System 36 in step 104, a plurality of alternative Tracking Numbers $N_1$, $N_2$, $N_3$, etc. can be generated by the Speech Correction System 38. These alternative Tracking Numbers $N_1$, $N_2$, $N_3$ are conventionally generated as statistically alternative recognized text to the received Tracking Number N, and displayed to the user in step 110 on the right screen of the video display unit 12. These alternative Tracking Numbers $N_1$, $N_2$, $N_3$ are presented to the user for possible selection therebetween, and based upon statistical probabilities, the alternatives are preferably presented in descending order of similarity to the received Tracking Number N.

Accordingly, the displayed list of alternatives could comprise alternative Tracking Numbers $N_1$, $N_2$, $N_3$ that are close in pronunciation or sequential numbering to the Tracking Number N received in step 104. For example, if the received Tracking Number N is "55085," representative alternative Tracking Numbers $N_1$, $N_2$, $N_3$ may include "55084, 55086, or 55075," or any other listing of likely alternatives as determined by the Speech Correction System 38. Moreover, each alternative may include an identifier, such as a number, to facilitate the user's selection of the desired correction. For example, in this hypothetical case, the display of alternative Tracking Numbers $N_1$, $N_2$, $N_3$ could comprise "1) 55084, 2) 55086, or 3) 55075."

As known, a "Pick" command can be a keyword input received at step 116. If so, this command is most beneficial when the alternate list already includes the desired correction. For example, from the list of displayed alternative Tracking Numbers $N_1$, $N_2$, $N_3$, the user could see the desired correction as the second alternative $N_2$. Then, the user would recite "Pick two," which would be recognized by the Speech Correction System 38. This selection among alternative Tracking Numbers $N_1$, $N_2$, $N_3$ could also be made by the manual input device 14 or other.

Based upon the displays at step 106 of the video display unit 12, the user can decide if the Speech Recognition System 36 received the correct utterance at step 104. At step 112, the user decides if the Speech Recognition Engine received the intended utterance, progressing to step 114 if it did, whereupon the Tracking Number N is stored as a record in a database by the Database Manager 40. Alternatively, if the user decides the Speech Recognition Engine did not recognize the intended utterance, the user may elect one of the displayed alternative Tracking Numbers $N_1$, $N_2$, $N_3$ from the right screen display in step 110. If the user recited something other than one of the alternative Tracking Numbers $N_1$, $N_2$, $N_3$, then other conventional Speech Recognition Engine correction commands may be employed, as indicated at step 120, after which control returns to step 104 for the re-dictation of a new Tracking Number N. If, on the other hand, the user has recited or otherwise elected one of the alternative Tracking Numbers $N_1$, $N_2$, $N_3$ displayed at step 110, the Speech Correction System 38 is programmed to accept the alternative Tracking Number $N_1$, $N_2$, $N_3$ by the user's reference thereto at step 116. After the user's selection, control then passes from step 116 to step 118, whereupon the selected alternative Tracking Number $N_1$, $N_2$, $N_3$ is stored as a record in the database by the Database Manger 40. From step 118, the user can again be presented with the selected Tracking Number N and the alternative Tracking Number $N_1$, $N_2$, $N_3$ in step 106.

In particular, it is possible that the user may still want to correct the Tracking Number $N_1$, $N_2$, $N_3$ if the user had misspecified the tracking number or if the system has misrecognized which tracking number the user wanted to select. Thus, returning again to step 112, the user again can decide if the correct tracking number is displayed. If so, then 114 control passes to step 122, whereupon the user will be permitted to specify an Item Name I to be associated with the Tracking Number N.

Figure 4:
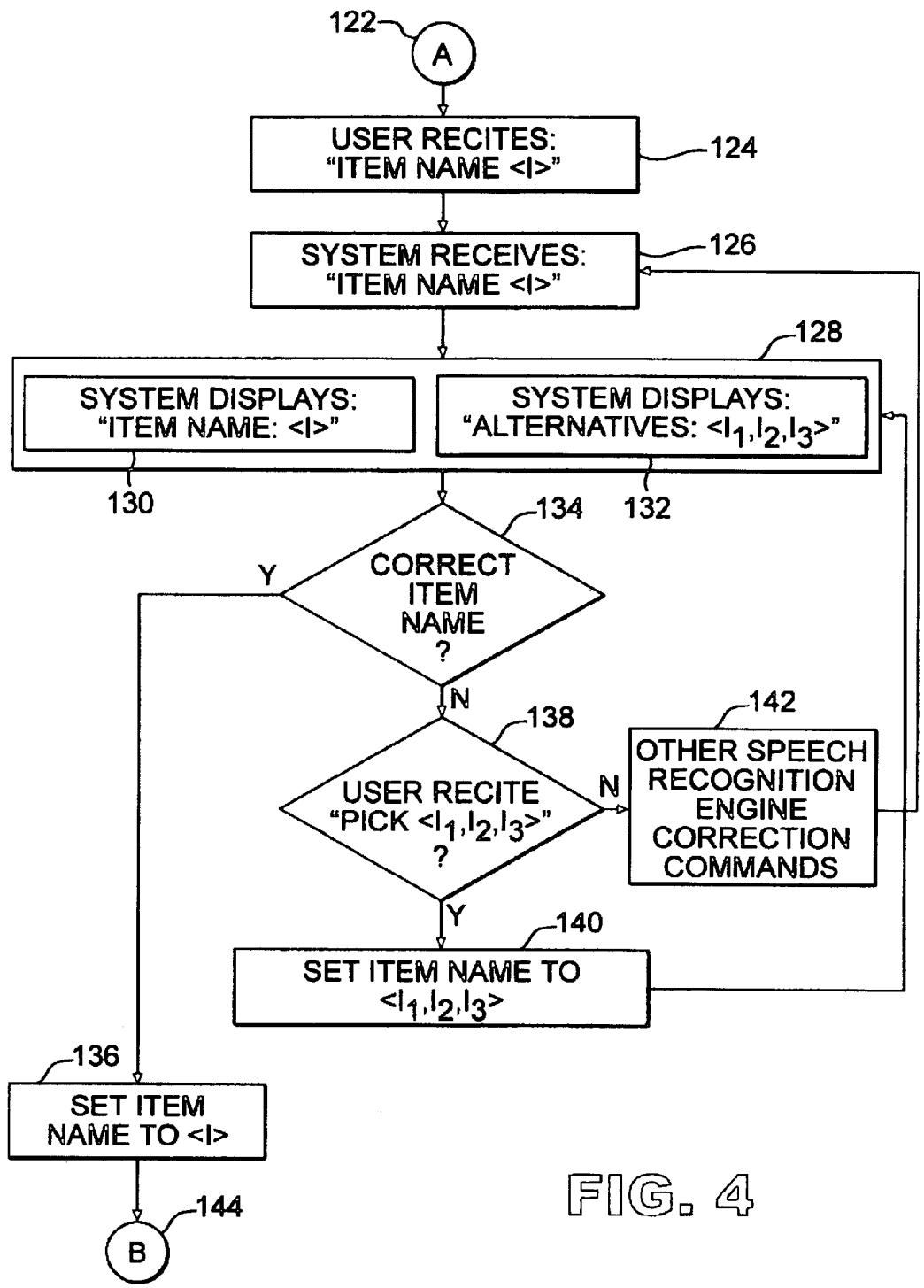

In step 124 of FIG. 4, the user speaks a second analog audio speech signal that is speech-to-text converted into a speech recognized text comprising an Item Name I such as "Small Dresser." An attention phrase or command word such as "Item Name" or "Computer" may not be necessary as the Speech Recognition Application 26 is programmed to receive such an input following the recitation of a Tracking Number N in steps 100–122. Moreover, the user may glance at the video display unit 12 to see what input the Speech Recognition Application 26 is awaiting, although the user may also immediately dictate the Item Name I after successfully dictating the Tracking Number N.

If an Item Name I is not recognized by the Speech Recognition System 36, it may be keyed in from the manual input device 14 or other and added to the working vocabulary of the Speech Recognition Application 26. After the recitation or other inputting of the Item Name I, it is received by the Speech Recognition System 36 in step 126. In practice, the recited Item Name I corresponds to the common name associated with the item identified by the Tracking Number N.

After the Speech Recognition System 36 successfully receives a valid Item Name I in step 126, it is displayed on the video display unit 12 at step 128. Preferably, the left screen of the video display unit 12 may display the Item Name I prefaced by a label identifier such as "Item Name," as indicated at step 130.

Based upon the Item Name I received by the Speech Recognition System 36 in step 126, a plurality of alternative Item Names $I_1$, $I_2$, $I_3$, etc. can be generated by the Speech Correction System 38. These alternative Item Names $I_1$, $I_2$, $I_3$ are conventionally generated as statically alternative recognized text to the received Item Name I, and displayed to the user in step 132 on the right screen of the video display unit 12. These alternative Item Names $I_1$, $I_2$, $I_3$ are presented to the user for possible selection therebetween, and based upon statical probabilities, the alternatives are preferably presented in descending order of similarity to the received Item Name I. Accordingly, the displayed list of alternatives could comprise alternative Item Names $I_1$, $I_2$, $I_3$ that are close in pronunciation to the Item Name I received in step 126. For example, if the received Item Name I is "Small Dresser," representative alternative Item Names $I_1$, $I_2$, $I_3$ $I_4$, $I_5$ may include "1) Small Dressers, 2) Smaller Dresser, 3) Smaller Dressers, 4) Small Dress, or 5) Small Dresses," or any other listing of likely alternatives as determined by the Speech Correction System 38. The number identifiers are intended to facilitate the user's selection of the desired correction, whereupon a "Select" command can be employed as explained above. The selection among alternative Item Names $I_1$, $I_2$, $I_3$ could also be made by the manual input device 14 or other.

Based upon the displays at step 128 of the video display unit 12, the user can decide if the Speech Recognition System 36 received the correct utterance at step 126. At step 134, the user decides if the Speech Recognition Engine received the intended utterance, progressing to step 136 if it did, whereupon the Item Name I is stored as a record in the database by the Database Manager 40, preferably associated with the record created for the Tracking Number N. Alternatively, if the user decides the Speech Recognition Engine did not recognize the intended utterance, the user may elect one of the displayed alternative Item Names $I_1$, $I_2$, $I_3$ from the right screen display in step 128. If the user recited something other than one of the alternative Item Names $I_1$, $I_2$, $I_3$, then other conventional Speech Recognition Engine correction commands may be employed, as indicated at step 142, after which control returns to step 126 for the re-dictation of a new Item Name I. If, on the other hand, the user has recited or otherwise elected one of the alternative Item Names $I_1$, $I_2$, $I_3$ displayed at step 132, the Speech Correction System 38 is programmed to accept the alternative Item Name $I_1$, $I_2$, $I_3$ by the user's reference thereto at step 138. After the user's selection, control then passes from step 138 to step 140, whereupon the selected alternative Item Name $I_1$, $I_2$, $I_3$ is stored as a record in the database by the Database Manger 40. From step 140, the user can again be presented with the selected Item Name I and the alternative Item Names $I_1$, $I_2$, $I_3$ in step 128.

In particular, it is possible that the user may still want to correct the Item Name $I_1$, $I_2$, $I_3$ if the user had misspecified the item name or if the system has misrecognized which item name the user wanted to select. Thus, returning again to step 134, the user again can decide if the correct item number is displayed. If so, then control passes to step 144, whereupon the user will be, permitted to specify a brief description of the condition C of the item associated with the Tracking Number N.

With respect to the recitation of an Item Name I, the list of alternative Item Names $I_1$, $I_2$, $I_3$ may be generated by any manner known to those skilled in the art. For example, when the user dictates the Item Name I "Small Table Lamp", the Speech Correction System 38 may, in performing conventional speech recognition on the is subject phrase, generate and display alternatives for each word in the recitation. Subsequently, the Speech Correction System 38 may select the statistically most likely alternative for each word in order to provide an accurate speech-to-text conversion on a word-by-word basis. For example, alternatives for "Small" could comprise "1) All, 2) Ball, or 3) Wall." Alternatives for "Table" could comprise "1) Cable, or 2) Label." Alternatives for "Lamp" could include "1) Camp, or 2) Ramp." These alternatives can be displayed to the user in sequential order in step 132, and will apply equally to the recitation of the condition of an item C, to be described presently.

Figure 5:
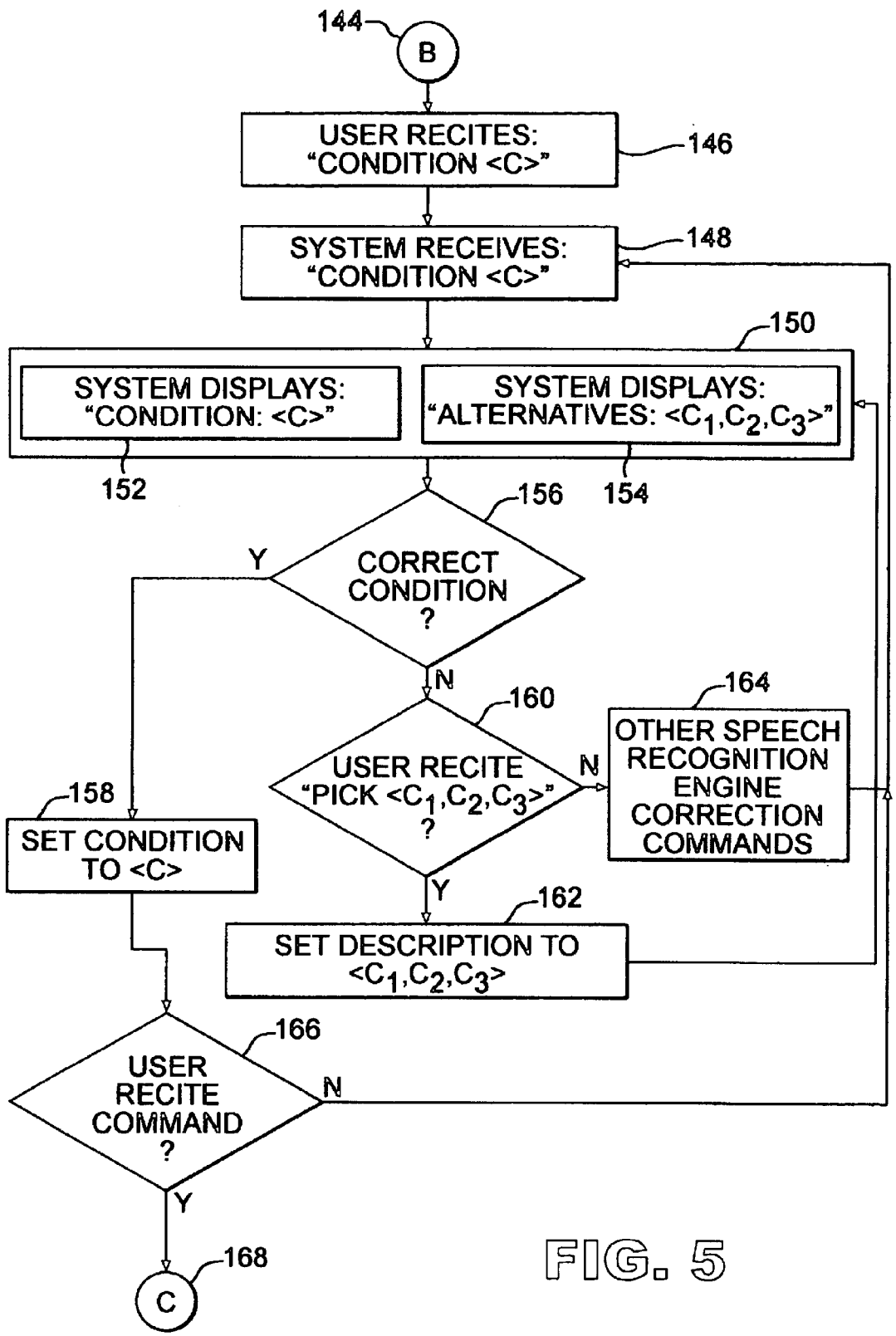

In step 146 of FIG. 5, the user speaks a third analog audio speech signal that is speech-to-text converted into a speech recognized text comprising a brief description of the condition of an item C such as "Scratched Top." An attention phrase or command word such as "Condition" or "Computer" may not be necessary as the Speech Recognition Application 26 is programmed to receive such an input following the recitation of an Item Name I in steps 122–144. Moreover, the user may glance at the video display unit 12 to see what input the Speech Recognition Application 26 is awaiting, although the user may also immediately dictate the Condition C after successfully dictating the Item Name I.

If a Condition C is not recognized by the Speech Recognition System 36, it may be keyed in from the manual input device 14 or other and added to the working vocabulary of the Speech Recognition Application 26. After the recitation or other inputting of the Condition C, it is received by the Speech Recognition System 36 in step 148. In practice, the recited Condition C corresponds to the description of the condition of the item identified by the Tracking Number N. Mover codes and legends are no longer referred to because the Speech Recognition Application 26 preferably allows for the entry of natural language syntax in this context.

After the Speech Recognition System 36 successfully receives a valid Condition C in step 148, it is displayed on the video display unit 12 at step 150. Preferably, the left screen of the video display unit 12 may display the Condition C prefaced by a label identifier such as "Condition," as indicated at step 152.

Based upon the Condition received by the Speech Recognition System 36 in step 148, a plurality of alternative Conditions $C_1$, $C_2$, $C_3$, etc. can be generated by the Speech Correction System 38. These alternative Conditions $C_1$, $C_2$, $C_3$ are conventionally generated as statically alternative recognized text to the received Condition C, and displayed to the user in step 154 on the right screen of the video display unit 12. These alternative Conditions $C_1$, $C_2$, $C_3$ are presented to the user for possible selection therebetween, and based upon statical probabilities, the alternatives are preferably presented in descending order of similarity to the received Condition C.

Accordingly, the displayed list of alternatives could comprise alternative Conditions $C_1$, $C_2$,$C_3$ that are close in pronunciation to the Condition C received in step 148. For example, if the received Condition is "Scratched Top," representative alternative Conditions $C_1$, $C_2$, $C_3$, $C_4$, $C_5$ may include "1) Bashed Top, 2) Scratched Tip, 3) Bashed TO Tip, 4) Scratched, or 5) Top," or any other listing of likely alternatives as determined by the Speech Correction System 38. The number identifiers are intended to facilitate the user's selection of the desired correction, whereupon a "Select" command can be employed as explained above. The selection among alternative Conditions $C_1$, $C_2$, $C_3$ could also be made by the manual input device 14 or other.

Based upon the displays at step 150 of the video display unit 12, the user can decide if the Speech Recognition System 36 received the correct utterance at step 148. At step 156, the user decides if the Speech Recognition Engine received the intended utterance, progressing to step 158 if it did, whereupon the Condition C is stored as a record in the database by the Database Manager 40, preferably associated with the record created for the Tracking Number N. Alternatively, if the user decides the Speech Recognition Engine did not recognize the intended utterance, the user may elect one of the displayed alternative Conditions $C_1$, $C_2$, $C_3$ from the right screen display in step 150. If the user recited something other than one of the alternative Conditions $C_1$, $C_2$, $C_3$, then other conventional Speech Recognition Engine correction commands may be employed, as indicated at step 164, after which control returns to step 148 for the re-dictation of a new Condition C. If, on the other hand, the user has recited or otherwise elected one of the alternative Conditions $C_1$, $C_2$, $C_3$ displayed at step 154, the Speech Correction System 38 is programmed to accept the alternative Condition $C_1$, $C_2$, $C_3$ by the user's reference thereto at step 160. After the user's selection, control then passes from step 160 to step 162, whereupon the selected alternative Condition $C_1$, $C_2$, $C_3$ is stored as a record in the database by the Database Manger 40. From step 162, the user can again be presented with the selected Condition C and the alternative Conditions $C_1$, $C_2$, $C_3$ in step 150.

In particular, it is possible that the user may still want to correct the Conditions $C_1$, $C_2$, $C_3$ if the user had misspecified the condition or if the system has misrecognized which condition the user wanted to select. Thus, returning again to step 156, the user again can decide if the correct condition is displayed. If so, then control passes to step 166, whereupon the user will be permitted to enter another Condition C or issue a command-and-control directive to the computing device 10.

Significantly, different items will have different numbers of Conditions C associated therewith because different items will need to be described differently. This results in the user employing different numbers of Conditions C to describe different items, with some items perhaps even requiring no description of the Condition C at all, in which case steps 144–168 can be skipped entirely. The different database allocations needed for the different numbers of Conditions C associated with each Tracking Number N are handled by the Data Base Manager 40, which dynamically allocates sufficient memory to each Tracking Number N as needed. Accordingly, steps 144–168 are continually repeated until all of the necessary Conditions C have been recorded. This loop iteratively continues until the Speech Recognition System 36 recognizes a command such as "Next Number," as indicated at step 166. Thereafter, the entire method, including steps 100–166, can be repeated until all of the items have been inventoried, with various command-and-control operations being performed thereon along the way.

Figure 6:
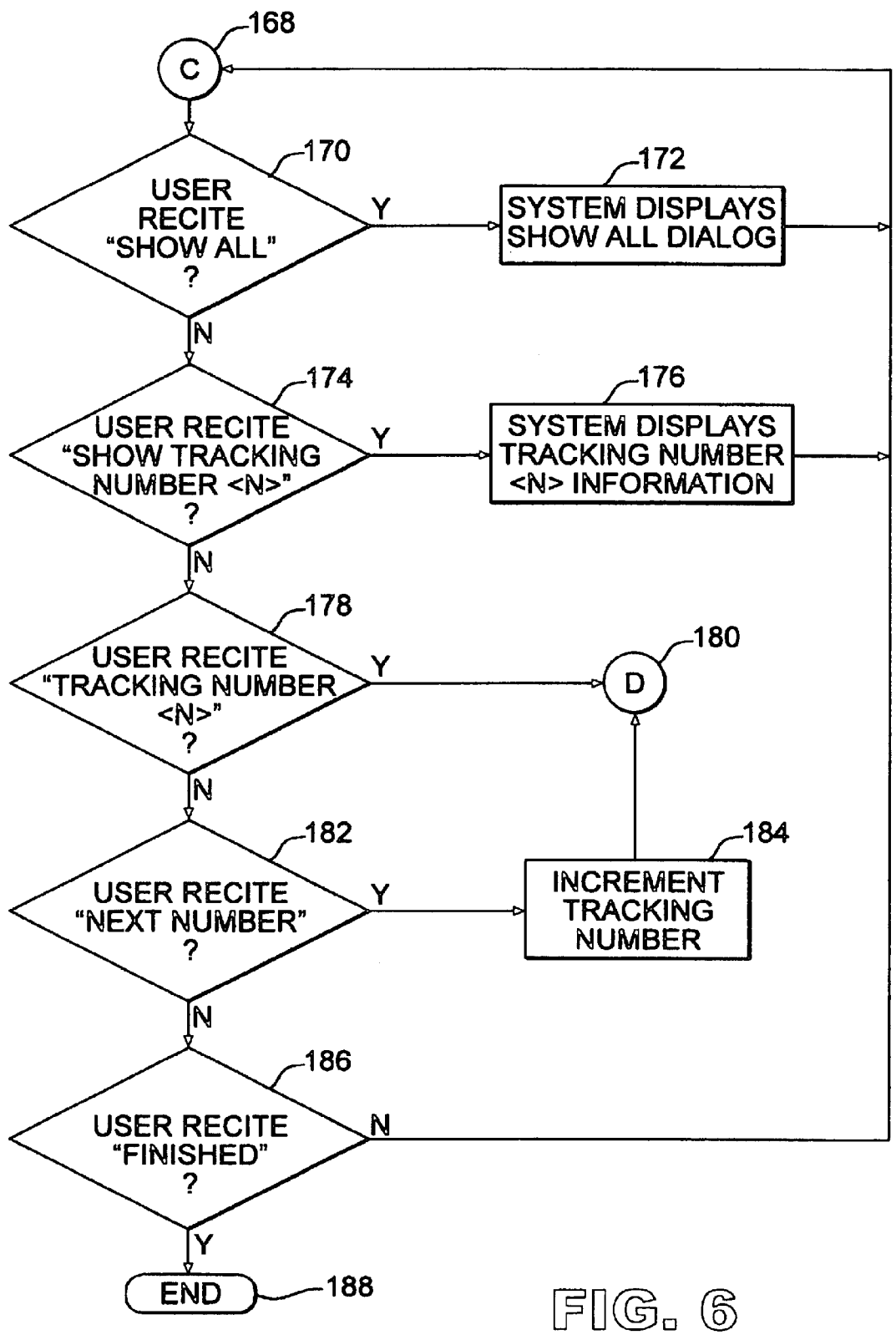

A representative sampling of command-and-control keywords is illustrated in FIG. 6. They may be invoked at any time during the execution of the present method. For example, upon detection by the Speech Recognition System 36 of a "Show All" command, as indicated at step 170, the video display unit 12 can display all the Tracking Numbers N and corresponding Item Names I in an ascending order, as indicated at step 172. From this list or otherwise, upon detection by the Speech Recognition System 36 of a "Show Tracking Number <N>" command, as indicated at step 174, the video display unit 12 can display all the information associated with that particular Tracking Number N, including the Item Name I and Conditions C, as indicated at step 176. These fields can also be edited by speech correction editing techniques known in the art, such as dictating "Change Condition $C_1$ to Condition $C_2$," or by placing a selection cursor at the beginning of a called-up record for additional editing by inputs received orally or from the manual input device 14 or other. An entire data record can even be deleted upon the recitation of a "Delete Tracking Number <N>" command, preferably followed by a confirmation step before the execution thereof.

In addition, upon the detection by the Speech Recognition System 36 of a "TracKing Number <N>" command, as indicated at step 178, the Speech Recognition Application 26 can return to step 104 in FIG. 3 for the entering of a new Tracking Number N and additional traversal of the method of the present invention, as shown at step 180 Alternatively, upon detection by the Speech Recognition System 36 of a "Next Number" command, as indicated at step 182, the Speech Recognition Application 26 can automatically increment the current TracKing Number N to the next available TracKing Number N+1, as shown at step 184. Then, the Speech Recognition Application 26 can return to step 104 in FIG. 3 for the entering of a new Tracking Number N and additional traversal of the method of the present invention, as shown at step 180. The user may also exit the Speech Recognition Application 26, as indicated at step 186, by the recitation of a termination word such as "Finished." Alternatively, the user may issue additional text or commands in accordance with the methodology of the present invention.

Other command-and-control commands may of course also be programmed, such as printing the records in the database for subsequent delivery thereof to the person being moved, or additional up-loading of the records to a relational database in communication with the computing device 10.

What is claimed is:

1. An inventory method comprising:

(a) receiving in a speech enabled inventory application disposed within a computing device a specified tracking number Identifying a movable inventory item and storing said specified tracking number in an inventory database;

(b) receiving in said speech enabled inventory application a spoken item description for said movable inventory item; speech-to-text converting said spoken item description into a speech recognized item description; visually displaying said speech recognized item description in said computing device; generating at least one alternative item description based on said speech recognized item description; visually displaying said at least one alternative item description in said computing device; storing said selected item description selected from among said speech recognized and at least one alternative item descriptions in said inventory database;

(c) receiving in said speech enabled inventory application a spoken item condition for said movable inventory item; speech-to-text converting said spoken item condition into a speech recognized item condition; visually displaying said speech recognized item condition in said computing device; generating at least one alternative item condition based on said speech recognized item condition; visually displaying said at least one alternative item condition in said computing device; storing a selected item condition selected from among said speech recognized and said at least one item conditions in said inventory database;

(d) repeating steps (a)–(c) for a plurality of movable items.

2. The method of claim 1, further comprising:
for at least a portion of said movable inventory items, repealing step (c) to record a plurality of conditions for said movable inventory item.

3. The method of claim 1, wherein said (a) receiving step comprises:
receiving in said speech enabled inventory application a spoken tracking number;
speech-to-text convening said spoken tracking number into a speech recognized tracking number;
visually displaying said speech recognized tracking number in said computing device;
generating at least one alternative tracking number based on said speech recognized tracking number; and,
visually displaying said at least one alternative tracking number in said computing device;
storing a selected tracking number selected from among said speech recognized tracking number and at least one alternative tracking numbers in said inventory database.

4. The method of claim 3, wherein said at least one alternative tracking number is statistically alternative recognized text to said spoken tracking number.

5. The method of claim 1, wherein said at least one alternative item description is a statistically alternative recognized text to said spoken item description.

6. The method of claim 1, wherein said at least one alternative condition is a statistically alternative recognized text to said spoken item condition.

7. The method of claim 1, wherein said (a) receiving step comprises:
scanning a tracking number encoded in a bar code label; and, storing said scanned tracking number in said inventory database.

8. A machine readable storage having stored thereon a computer program having a plurality of code sections for performing an inventory task in a speech enabled inventory application, said code sections executable by a machine for causing said machine to perform the steps of:
(a) receiving in a speech enabled inventory application disposed within a computing device a specified tracking number identifying a movable inventory item and storing said specified tracking number in an inventory database;
(b) receiving in said speech enabled inventory application a spoken item description for said movable inventory item; speech-to-text converting said spoken item description into a speech recognized item description; visually displaying said speech recognized item description in said computing device; generating at least one alternative item description based on said speech recognized item description; visually displaying said at least one alternative item description in said computing device; storing said selected item description selected from among said speech recognized and at least one alternative item descriptions in said inventory database;
(c) receiving in said speech enabled inventory application a spoken item condition for said movable inventory item; speech-to-text converting said spoken item condition into a speech recognized item condition; visually displaying said speech recognized item condition in said computing device; generating at least one alternative item condition based on said speech recognized item condition; visually displaying said at least one alternative item condition in said computing device; storing a selected item condition selected from among said speech recognized and said at least one item conditions in said inventory database;
(d) repeating steps (a)–(c) for a plurality of movable items.

9. The machine readable storage of claim 8, further comprising:
for at least a portion of said movable inventory items, repeating step (c) to record a plurality of conditions for said movable inventory item.

10. The machine readable storage of claim 8, wherein said (a) receiving step comprises:
receiving in said speech enabled inventory application a spoken tracking number;
speech-to-text converting said spoken tracking number into a speech recognized tracking number;
visually displaying said speech recognized tracking number in said computing device;
generating at least one alternative tracking number based on said speech recognized tracking number; and,
visually displaying said at least one alternative tracking number in said computing device;
storing a selected tracking number selected from among said speech recognized tracking number and at least one alternative tracking numbers in said inventory database.

11. The machine readable storage of claim 10, wherein said at least one alternative tracking number is statistically alternative recognized text to said spoken tracking number.

12. The machine readable storage of claim 8, wherein said at least one alternative item description is a statistically alternative recognized text to said spoken item description.

13. The machine readable storage of claim 8, wherein said at least one alternative condition Is a statistically alternative recognized text to said spoken item condition.

14. The machine readable storage of claim 8, wherein said (a) receiving step comprises;
scanning a tracking number encoded in a bar code label; and,
storing said scanned tracking number in said inventory database.

15. An inventory method comprising:
assigning a tracking number to each movable inventory item in a set of movable inventory items;
speaking said tracking number and a corresponding item description and condition to a speech enabled inventory application in a computing device, said speech enabled inventory application speech-to-text converting said spoken tracking number and corresponding item description and condition, said speech enabled inventory application providing at least one statistically alternate recognized word for each of said spoken tracking number and corresponding item description and condition; and,
selecting one tracking number, one item description and one item condition from among-said spoken and alternate tracking numbers, said spoken and alternate item descriptions, and said spoken and alternative item conditions, said speech enabled inventory application storing said selected tracking number, item description and condition in an inventory database.

16. The inventory method of claim 15, further comprising:
generating a report listing stored tracking numbers and corresponding item descriptions and conditions.

17. The inventory method of claim 15, further comprising:
   establishing a communications link between the computing device and at least one other computing device; and,
   electronically transmitting said stored inventory database over said communications link to selected ones of said at least one other computing device.

18. The inventory method of claim 15, wherein said computing device is a handheld computing device.

19. The inventory method of claim 17, wherein said computing devices are a handheld computing devices.

20. The inventory method of claim 19, wherein said communications link is a wireless communications link.

21. The inventory method of claim 15, wherein said assigning step comprises:
   automatically generating a next tracking number in a sequence of tracking numbers; and,
   assigning said automatically generated next tracking number to said movable inventory item.

22. An inventory method comprising the steps of:
   (a) receiving an identifier for at least one movable item, wherein said identifier comprises a tracking number unique to said movable item;
   (b) receiving in a handheld computing device a spoken item description and at least one spoken item condition for said movable item;
   (c) converting said spoken item description into at least one description speech output, wherein said at least one description speech output comprises a speech recognized item description and at least one alternative item description;
   (d) converting said spoken condition description into at least one condition speech output, wherein said at least one condition speech output comprises a speech recognized item condition and at least one alternative item description; and,
   (e) visually presenting said tracking number, said speech recognized item description, and said speech recognized item condition within said handheld computing device.

23. The method of claim 22, wherein said at least one item condition comprises a plurality of said speech recognized item conditions.

24. The method of claim 22, further comprising the steps of:
   repeating steps a, b, c, d, and e for a plurality of movable items; and,
   printing an inventory sheet comprising said tracking number, said speech recognized item description, and said speech recognized item condition for each of said plurality of movable items.

\* \* \* \* \*

Disclaimer

6,728,676—Kerry A. Ortega, Raleigh, NC (US). USING SPEECH RECOGNITION TO IMPROVE EFFICIENCY OF AN INVENTORY TASK Patent dated Apr. 27, 2004. Disclaimers filed Oct. 5, 2006, by the assignee, International Business Machines Corporation.

Hereby enter this disclaimer to all claims, of said patent.

*(Official Gazette, January 9, 2007)*